(12) United States Patent
Brink et al.

(10) Patent No.: US 6,395,823 B1
(45) Date of Patent: *May 28, 2002

(54) THERMOPLASTIC POLYURETHANE ADDITIVES FOR IMPROVED POLYMER MATRIX COMPOSITES AND METHODS OF MAKING AND USING THEREFOR

(75) Inventors: Andrew E. Brink, Durham, NC (US); Jeffrey T. Owens, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/494,694

(22) Filed: Jan. 31, 2000

Related U.S. Application Data

(62) Division of application No. 09/140,514, filed on Aug. 26, 1998, now Pat. No. 6,043,313.
(60) Provisional application No. 60/057,894, filed on Sep. 4, 1997.

(51) Int. Cl.[7] ............................. C08J 3/00; C08K 3/20; C08L 51/00; C08L 67/00; C08L 75/00
(52) U.S. Cl. ........................... 524/539; 428/1; 428/357; 428/359; 428/383; 428/423.1; 523/200; 523/205; 523/206; 523/217; 523/400; 523/444; 524/589; 524/590; 524/492; 524/493; 524/494; 524/495; 524/496; 525/403; 525/408; 525/438; 525/440; 525/452; 525/453; 525/454
(58) Field of Search .................................. 524/539, 589, 524/590, 492, 493, 494, 495, 496; 523/200, 205, 206, 217, 400, 444; 525/403, 408, 438, 440, 452, 453, 454; 428/1, 357, 359, 383, 423.1

(56) References Cited

U.S. PATENT DOCUMENTS

| | | | |
|---|---|---|---|
| 3,075,952 A | 1/1963 | Conyer et al. | |
| 3,330,809 A | 7/1967 | Perlowski et al. | |
| 3,853,821 A | 12/1974 | Sid-Ahmed et al. | |
| 4,071,503 A | 1/1978 | Thomas et al. | |
| 4,369,285 A | 1/1983 | Sanderson et al. | |
| 4,376,834 A | 3/1983 | Goldwasser et al. | |
| 4,474,906 A | 10/1984 | Nakama et al. | |
| 4,567,236 A | 1/1986 | Goldwasser et al. | |
| 4,568,720 A | 2/1986 | Aharoni et al. | |
| 4,755,587 A | 7/1988 | Rinehart | |
| 4,792,573 A | 12/1988 | Cohn | |
| 4,822,827 A | 4/1989 | Bonk et al. | |
| 4,849,497 A | 7/1989 | Scannapieco | |
| 4,857,603 A | 8/1989 | Akkapeddi et al. | |
| 4,876,326 A | 10/1989 | Rinehart | |
| 4,957,945 A | 9/1990 | Cohn | |
| 4,977,196 A | 12/1990 | Scannapieco | |
| 5,145,742 A | 9/1992 | Yau | |
| 5,258,445 A | 11/1993 | Sperk, Jr. et al. | |
| 5,334,647 A | 8/1994 | Sperk, Jr. et al. | |
| 5,519,094 A | 5/1996 | Tseng et al. | |
| 6,043,313 A | * 3/2000 | Brink et al. | 524/589 |

FOREIGN PATENT DOCUMENTS

| | | |
|---|---|---|
| CA | 1111984 | 11/1981 |
| WO | WO 92/17522 | 10/1992 |
| WO | WO 93/22383 | 11/1993 |
| WO | WO 95/26432 | 10/1995 |

OTHER PUBLICATIONS

Inata et al., Chain Extenders for Polyesters. I. AdditionType Chain Extenders Reactive with Carboxyl End Groups of Polyesters, Journal of Applied Polymer Science, vol. 30, pp. 3325–3337, 1985.

Simon et al., Thermal Stability of Polyurethanes, Chromatographia, vol. 25, No. 2, Feb. 1988.

Yang et al., Thermal Degradation of Urethanes Based on 4,4'-Diphenylemethane Diisocyanate and 1,4-Butanediol (MDI/BDO), Polymer, vol. 27, Aug., pp. 1235–1240, 1986.

Cardi et al., Chain Extension of Reyclcled Poly(ethylene terephthalate) with 2,2'-Bix(2-oxazoline), Journal of Applied Polymer Science, vol. 50, pp. 1501–1509, 1993.

Bikiaris et al., Chain Extension of Polyesters PET and PBT with Two New Diimidodiepoxides. II, Journal of Polymer Science: Part A: Polymer Chemistry, vol. 34, pp. 1337–1341, 1996.

(List continued on next page.)

Primary Examiner—Patrick D. Niland
(74) Attorney, Agent, or Firm—Cheryl J. Tubach; B. J. Boshears; Bernard J. Graves, Jr.

(57) ABSTRACT

The present invention relates to a composite made by the process of melt mixing (a) a polymer having at least one isocyanate reactive group, wherein the polymer is from 30 to 90% by weight of the composite; (b) a thermoplastic polyurethane at from 0.1 to less than 10% by weight of the composite; and (c) a reinforcing fiber at from 9.9 to 60% by weight of the composite, wherein the sum of the weight percentages of components (a)–(c) is equal to 100%, wherein the polymer (a) is not a polyamide. The invention further relates to a composite prepared by the process of melt mixing (a) a polymer having at least one isocyanate reactive group, wherein the polymer is from 25 to 90% by weight of the composite; (b) a thermoplastic polyurethane at from 0.1 to 10% by weight of the composite; (c) a reinforcing fiber at from 9.8 to 60% by weight of the composite, and (d) an epoxy compound at from 0.1 to 5% by weight of the composite, wherein the sum of the weight percentages of components (a)–(d) is equal to 100%. The invention further relates to the methods for making the composites of the present invention. The invention further relates to articles containing the composites of the present invention.

25 Claims, No Drawings

OTHER PUBLICATIONS

Kordomenos et al., Thermal Stability of Isocyanate–Based Polymers. 1. Kinetics of the Thermal Dissosiation of Urethane, Oxazolidone, and Isocyanurate Groups, Macromolecules 14, pp. 1434–1437, 1961.

Joel et al., Thermal Dissociation of Urethanes Studies by FTIR Spectroscopy, Die Angewandte Makromolekulare Chemie 217 191–199 (Nr. 3806), 1994.

Hert, Tough Thermoplasatic Polyesters By Reactive Extrusion With Epoxy–Containing Copolymers, Die Angewandte Makromolekulare Chemie 196, 89–99 (Nr. 3377), 1992.

Jacques et al., Reactions Induced By Triphenyl Phosphite Addition During Melt Mixing of Poly(ethylene terephthalate)/Poly(butylene terephthalate) Blends: Influence On Polyester Molecular Structure And Thermal Behaviour, Polymer, vol. 37, No. 71, pp. 1189–1200, 1996.

Akkapeddi et al., Chain Extension of PET and Nylon In An Extruder, Polymer Preprint, 29(1), pp. 567–570, 1988.

JP 07 166048, Derwent Publications Ltd., London, GB, Jun. 27, 1995.

* cited by examiner

THERMOPLASTIC POLYURETHANE ADDITIVES FOR IMPROVED POLYMER MATRIX COMPOSITES AND METHODS OF MAKING AND USING THEREFOR

CROSS REFERENCE TO RELATED APPLICATIONS

This application is a divisional of Ser. No. 09/140,514, filed Aug. 26, 1998, now U.S. Pat. No. 6,043,313 which claims priority upon U.S. provisional application Serial No. 60/057,894, filed Sep. 4, 1997, the contents of which are herein incorporated in their entirety by this reference.

FIELD OF THE INVENTION

The present invention relates to polymer matrix composites composed of a polymer, a thermoplastic polyurethane, and a reinforcing fiber and articles made from the composites of the present invention.

BACKGROUND OF THE INVENTION

The prior art discloses compounding polymers with a fiber (e.g. glass or carbon) or other polymers to produce a reinforced composite. The object of producing the reinforced composite is to increase or enhance the physical properties of the composite. In particular, increasing the thermal and hydrolytic stability of the composite would be advantageous.

The prior art discloses the combination of polyurethanes and polymers in order to increase the mechanical properties of the resultant blend. U.S. Pat. No. 5,519,094 to Tseng et al. and U.S. Pat. No. 5,258,445 to Sperk et al. disclose the combination of a thermoplastic polyurethane, a polyester, and a glass fiber to produce a molding composition. International Patent No. WO 95/26432 to Wagner et al. disclose the preparation of an abrasion resistant polyester blend composed of a thermoplastic polyester, a thermoplastic polyurethane, and optionally, nonpolymeric additives that exhibits improved processing safety. Canadian Patent No. 1,111,984 (hereafter CA '111) discloses a poly(butylene terephthalate)/polyurethane molding composition. Tseng et al., Sperk et al., Wagner et al., and CA '111 teach one of ordinary skill in the art to use a higher amounts of polyurethane in order to increase or enhance the mechanical properties of the blend.

In light of the above it would be very desirable to produce a polymer composite that possesses increased hydrolytic and thermal stability, mechanical strength, and ductility. Moreover, it would be advantageous to produce a polymer composite that requires smaller amounts of polyurethane while possessing superior physical properties.

SUMMARY OF THE INVENTION

In accordance with the purpose(s) of this invention, as embodied and broadly described herein, this invention, in one aspect, relates to a composite made by the process comprising melt mixing
  (a) a polymer having at least one isocyanate reactive group, wherein the polymer is from 30 to 90% by weight of the composite;
  (b) a thermoplastic polyurethane at from 0.1 to less than 10% by weight of the composite; and
  (c) a reinforcing fiber at from 9.9 to 60% by weight of the composite,
wherein the sum of the weight percentages of components (a)–(c) is equal to 100%, wherein the polymer (a) is not a polyamide.

The invention further relates to a composite prepared by the process comprising melt mixing
  (a) a polymer having at least one isocyanate reactive group, wherein the polymer is from 25 to 90% by weight of the composite;
  (b) a thermoplastic polyurethane at from 0.1 to 10% by weight of the composite;
  (c) a reinforcing fiber at from 9.8 to 60% by weight of the composite, and
  (d) an epoxy compound at from 0.1 to 5% by weight of the composite,
wherein the sum of the weight percentages of components (a)–(d) is equal to 100%.

The invention further relates to a composite prepared by the process comprising melt mixing
  (a) a polyester or a liquid crystalline polymer;
  (b) a thermoplastic polyurethane at from 0.1 to 10% by weight of the composite; and
  (c) a reinforcing fiber,
wherein the sum of the weight percentages of components (a)–(c) is equal to 100%.

The invention further relates to a composite comprising
  (a) a polymer having at least one isocyanate reactive group, wherein the polymer is from 30 to 90% by weight of the composite;
  (b) a thermoplastic polyurethane at from 0.1 to less than 10% by weight of the composite; and
  (c) a reinforcing fiber at from 9.9 to 60% by weight of the composite,
wherein the sum of the weight percentages of components (a)–(c) is equal to 100%, wherein the polymer (a) is not a polyamide.

The invention further relates to a composite comprising
  (a) a polymer having at least one isocyanate reactive group, wherein the polymer is from 25 to 90% by weight of the composite;
  (b) a thermoplastic polyurethane at from 0.1 to 10% by weight of the composite;
  (c) a reinforcing fiber at from 9.8 to 60% by weight of the composite, and
  (d) an epoxy compound at from 0.1 to 5% by weight of the composite,
wherein the sum of the weight percentages of components (a)–(d) is equal to 100%.

The invention further relates to a method for making a composite, comprising melt mixing
  (a) a polymer having at least one isocyanate reactive group, wherein the polymer is from 30 to 90% by weight of the composite;
  (b) a thermoplastic polyurethane at from 0.1 to less than 10% by weight of the composite; and
  c) a reinforcing fiber at from 9.9 to 60% by weight of the composite,
wherein the sum of the weight percentages of components (a)–(c) is equal to 100%, wherein the polymer (a) is not a polyamide.

The invention further relates to a method for making a composite, comprising melt mixing
  (a) a polymer having at least one isocyanate reactive group, wherein the polymer is from 25 to 90% by weight of the composite;
  (b) a thermoplastic polyurethane at from 0.1 to 10% by weight of the composite;

(c) a reinforcing fiber at from 9.8 to 60% by weight of the composite, and (d) an epoxy compound at from 0.1 to 5% by weight of the composite, wherein the sum of the weight percentages of components (a)–(d) is equal to 100%.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

The term "isocyanate reactive group" is any group that can react with an isocyanate moiety as shown in Equation 1. Examples of isocyanate reactive groups include, but are not limited to hydroxyl groups, amino groups, carbonate groups, or carboxyl groups.

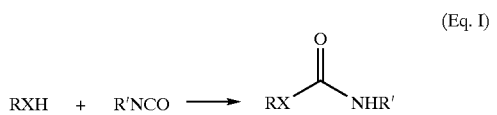

(Eq. I)

A "carbonyl compound" is any carboxylic acid, ester, acid halide, or anhydride. The term "dicarbonyl compound" is any dicarboxylic acid, diester, diacid halide, or dianhydride.

The term "glycol" is any compound that possesses at least two hydroxyl groups. Additionally, a glycol can be any precursor compound that is readily converted to a compound possessing two hydroxyl groups. An example of such a compound is hydroquinone (I), which can be converted to biphenol (II) using techniques known in the art.

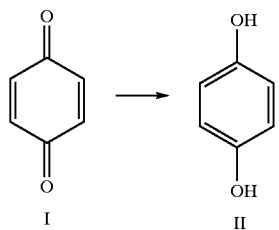

In accordance with the purpose(s) of this invention, as embodied and broadly described herein, this invention, in one aspect, relates to a composite made by the process comprising melt mixing (a) a polymer having at least one isocyanate reactive group, wherein the polymer is from 30 to 90% by weight of the composite;

(b) a thermoplastic polyurethane at from 0. to less than 10% by weight of the composite; and (c) a reinforcing fiber at from 9.9 to 60% by weight of the composite, wherein the sum of the weight percentages of components (a)–(c) is equal to 100%, wherein the polymer (a) is not a polyamide.

The invention further relates to a composite prepared by the process comprising melt mixing (a) a polymer having at least one isocyanate reactive group, wherein the polymer is from 25 to 90% by weight of the composite;

(b) a thermoplastic polyurethane at from 0.1 to 10% by weight of the composite;

(c) a reinforcing fiber at from 9.8 to 60% by weight of the composite, and (d) an epoxy compound at from 0.1 to 5% by weight of the composite, wherein the sum of the weight percentages of components (a)–(d) is equal to 100%.

The invention further relates to a composite prepared by the process comprising melt mixing (a) a polyester or a liquid crystalline polymer;

(b) a thermoplastic polyurethane at from 0.1 to 10% by weight of the composite; and (c) a reinforcing fiber, wherein the sum of the weight percentages of components (a)–(c) is equal to 100%.

The invention further relates to a composite comprising (a) a polymer having at least one isocyanate reactive group, wherein the polymer is from 30 to 90% by weight of the composite;

(b) a thermoplastic polyurethane at from 0.1 to less than 10% by weight of the composite; and.

(c) a reinforcing fiber at from 9.9 to 60% by weight of the composite, wherein the sum of the weight percentages of components (a)–(c) is equal to 100%, wherein the polymer (a) is not a polyamide.

The invention further relates to a composite comprising (a) a polymer having at least one isocyanate reactive group, wherein the polymer is from 25 to 90% by weight of the composite;

(b) a thermoplastic polyurethane at from 0.1 to 10% by weight of the composite;

(c) a reinforcing fiber at from 9.8 to 60% by weight of the composite, and (d) an epoxy compound at from 0.1 to 5% by weight of the composite, wherein the sum of the weight percentages of components (a)–(d) is equal to 100%.

The polymer used in the present invention has at least one isocyanate reactive group. The role of the isocyanate reactive group with respect to producing a polymer composite will be discussed below. In one embodiment, the polymer comprises a polyester, a liquid crystalline polymer, a polyamide, a polycarbonate, or a combination thereof.

In one embodiment, the polymer comprises a polyester. Polyesters useful in the present invention comprise the reaction product between at least one first glycol component comprising an aliphatic glycol, a cycloaliphatic glycol, an aromatic glycol, or a combination thereof, and at least one first dicarbonyl component comprising an aliphatic dicarbonyl compound, a cycloaliphatic dicarbonyl compound, an aromatic dicarbonyl compound, or a combination thereof.

In one embodiment, the first glycol component comprises a first glycol compound comprising ethylene glycol; propylene glycol; 1,3-propanediol; 1,4-butanediol; 1,6-hexanediol; 1,8-octanediol; 1,10-decanediol; 2,2-dimethyl-1,3-propanediol; 1,4-cyclohexanedimethanol; diethylene glycol; polyethylene glycol; polypropylene glycol; polytetramethylene glycol, or a combination thereof. In one embodiment, the first glycol compound comprises ethylene glycol; 1,3-propanediol; 1,4-butanediol, or 1,4-cyclohexanedimethanol. In another embodiment, the first glycol compound has from 2 to 10 carbon atoms. In another embodiment, the first glycol component further comprises a second glycol compound, wherein the second glycol compound comprises glycerol, trimethyolpropane, pentaerythritol, or a combination thereof. In this embodiment, the second glycol component behaves as a branching agent, which forms branches off the polymer backbone.

Examples of first dicarbonyl compounds that can react with the glycol component to produce the polyester include, but are not limited to, terephthalic acid, isophthalic acid, naphthalenedicarboxylic acid, cyclohexanedicarboxylic acid, or a combination thereof. In one embodiment, the first dicarbonyl component comprises terephthalic acid, cyclohexanedicarboxylic acid, or naphthalenedicarboxylic acid. Any of the isomers of naphthalenedicarboxylic acid and cyclohexanedicarboxylic acid are useful in the present invention. For example, the cis-, trails-, or cisltrans isomers of cyclohexanedicarboxylic acid can be used. In one embodiment, the 2,6-isomer of naphthalenedicarboxylic acid can be used.

In another embodiment, the polyester further comprises the reaction product of a second dicarbonyl compound comprising a $C_4$ to $C_{40}$ dicarbonyl compound. The second dicarbonyl is a modifying dibasic acid. In one embodiment, the second dicarbonyl compound comprises succinic acid, glutaric acid, adipic acid, sebacic acid, dimer acid, or a combination thereof.

In another embodiment, the first dicarbonyl component further comprises a third dicarbonyl compound, wherein the third dicarbonyl compound comprises trimellitic acid, trimellitic anhydride, pyromellitic anhydride, or a combination thereof. The third dicarbonyl compound can also behave as a branching agent as described above.

In one embodiment, the first dicarbonyl component comprises at least 40 mole % of the first dicarbonyl compound, wherein the sum of the dicarbonyl compounds of the first dicarbonyl component equals 100 mole %.

In one embodiment, the polyester has an inherent viscosity of from 0.2 to 1.5 dL/g, preferably from 0.3 to 1.2 dL/g as determined in 60/40 phenol/tetrachloroethane. Examples of polyesters useful in the present invention include, but are not limited to, poly(butylene terephthalate), poly(propylene terephthalate), poly(ethylene terephthalate), poly(ethylene naphthalate), poly(cyclohexanedimethylene terephthalate), or a combination thereof. In a preferred embodiment, the polyester is poly(ethylene terephthalate) or poly(butylene terephthalate).

In another embodiment, the polymer comprises a liquid crystalline polymer. Any of the liquid crystalline polymers disclosed in U.S. Pat. Nos. 4,169,933 and 4,161,470 are useful in the present invention, and are hereby incorporated by reference in their entirety.

In one embodiment, the liquid crystalline polymer comprises the reaction product between a second glycol component and a first carbonyl component. In one embodiment, the second glycol component comprises hydroquinone, biphenol, cyclohexanedimethanol, or a combination thereof. In one embodiment, the first carbonyl component comprises p-hydroxybenzoic acid, 6-hydroxy-2-naphthoic acid, p-acyloxybenzoic acid, 2,6-naphthalenedicarboxylic acid, terephthalic acid, isophthalic acid, or a combination thereof, preferably p-hydroxybenzoic acid, 2,6-naphthalenedicarboxylic acid, or terephthalic acid. In one embodiment, the liquid crystalline polyester has a molecular weight of from 5,000 to 25,000.

In another embodiment, the polymer comprises a polyamide. Any polyamide disclosed in the art can be used in the present invention. In one embodiment, the polyamide comprises the reaction product between a diamine and a second dicarbonyl component. In one embodiment, the diamine comprises a branched or straight chain aliphatic diamine, an aromatic diamine, or a cycloaliphatic diamine. In one embodiment, the diamine comprises $H_2N(CH_2)_nNH_2$, wherein n is from 2 to 16. In one embodiment, the diamine comprises ethylenediamine, trimethylenediamine, tetramethylenediamine, pentamethylenediamine, hexamethylenediamine, 1,4-cyclohexanedimethylamine, 2-methyl-1,5-pentamethylenediamine, or a combination thereof. In one embodiment, the second dicarbonyl component comprises a compound having the formula $HO_2C—Y—CO_2H$ or the salt or diester thereof, wherein Y has at least two carbon atoms. In another embodiment, the second dicarbonyl component comprises sebacic acid, octadecanedioic acid, suberic acid, azelaic acid, undecanedioic acid, glutaric acid, pimelic acid, adipic acid, terephthalic acid, isophthalic acid, naphthalenedicarboxylic acid, cyclohexanedicarboxylic acid, or a combination thereof. In one embodiment, the second dicarbonyl component comprises adipic acid.

In another embodiment, the polyamide comprises the self-condensation product of an amino carboxylic acid, In one embodiment, the amino carboxylic acid has from 2 to 16 carbon atoms between the amino group and the carboxylic acid group. In one embodiment, the amino carboxylic acid comprises 3-amino benzoic acid, 4-amino benzoic acid, or a combination thereof.

Any lactam known in the art can be used in the present invention. In one embodiment, the polyamide comprises the self-condensation product of a lactam. In one embodiment, the lactam comprises &-aminocaproic acid, butyrolactam, pivalactam, caprolactam, capryllactam, enantholactam, undecolactam, dodecanolactam, or a combination thereof. In one embodiment, the lactam comprises caprolactam.

In one embodiment, the polyamide comprises the self-condensation product of caprolactam (NYLON 6®); the reaction product between adipic acid and hexamethylenediamine (NYLON 66®); or the reaction product between adipic acid and tetramethylenediamine (NYLON 4,6®). In another embodiment, the polyamide comprises a polyphthalamide.

A variety of polycarbonates can be used in the present invention. In one embodiment, the polycarbonate comprises bisphenol A polycarbonate.

In one embodiment, the polymer of the present invention is from 50 to 80% by weight, preferably from 55 to 75% by weight, more preferably from 60 to 70% by weight of the admixture, wherein the sum of the weight percentages of components (a)–(c) is equal to 100%.

Any thermoplastic polyurethane known in the art is useful in the present invention. Examples of thermoplastic polyurethanes than can be used in the present invention are disclosed in U.S. Pat. Nos. 4,822,827; 4,376,834, and 4,567,236, which are incorporated by reference in their entirety. The thermoplastic polyurethanes of the present invention can be both rigid and elastomeric.

In one embodiment, the thermoplastic polyurethane comprises the reaction product between a polyisocyanate and a diol component. Examples of polyisocyanates include, but are not limited to, a methylenebis(phenyl isocyanate), a cycloaliphatic diisocyanate, a cyclohexylene diisocyanate, or a combination thereof In one embodiment, any of the 4,4'-isomer, the 2,4'-isomer, or combinations thereof of methylenebis(phenyl isocyanate) can be used. Examples of other methylenebis(phenyl isocyanates) include, but are not limited to, m- and p-phenylene diisocyanates; chlorophenylene diisocyanates; α, α'-xylylene diisocyanate; 2,4- and 2,6-toluene diisocyanate and mixtures of these latter two isomers, toluidine diisocyanate, hexamethylene diisocyanate; 1,5-naphthalene diisocyanate, or isophorone diisocyanate.

In one embodiment, the methylenebis(cyclohexyl isocyanate) is the 4,4'-isomer, the 2,4'-isomer and mixtures thereof. Any of the geometric isomers including transtrans, cistrans, ciscis and mixtures thereof can be used. Examples of cycloaliphatic diisocyanates include, but are not limited to, cyclohexylene diisocyanates (1,2-; 1,3-; or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), or 4,4'-diisocyanatodicyclohexyl.

In another embodiment, the isocyanate is a modified form of methylenebis(phenyl isocyanate). These isocyanates have been reacted with an aliphatic glycol or a mixture of aliphatic glycols, such as described in U.S. Pat. Nos. 3,394,164: 3,644,457; 3,883,571; 4,031,026; 4,115,429; 4,118,411; and 4,299,347, which are hereby incorporated by reference in their entirety.

In one embodiment, the diol component comprises at least one cycloaliphatic diol and at least one diol extender. In one embodiment, the cycloaliphatic diol comprises 1,3-cyclobutanediol; 1,3-cyclopentanediol; 1,2-cyclohexanediol; 1,3-cyclohexanediol; 1,4-cyclohexanediol, 2-cyclohexene-1,4-diol; 2-methyl-1,4-cyclohexanediol; 2-ethyl-1,4-cyclohexanediol; 1,3-cycloheptanediol; 1,4-cycloheptanediol; 2-methyl-1,4-cycloheptanediol; 4-methyl-1,3-cycloheptanediol; 1,3-cyclooctanediol; 1,4-cyclooctanediol; 1,5-cyclooctanediol, 5-methyl-4-cyclooctanediol; 5-ethyl-4-cyclooctanediol; 5-propyl-1,4-cyclooctanediol; 5-butyl-1,4-cyclooctanediol; 5-hexyl-1,4-cyclooctanediol; 5-heptyl-1,4-cyclooctanediol; 5-octyl-1,4-cyclooctanediol; 4,4'-methylenebis(cyclohexanol); 4,4'-methylenebis(2-methylcyclohexanol); 4,4'-methylenebis(3-methylcyclohexanol); 3,3'-methylenebis(cyclohexanol); 4,4'-ethylenebis(cyclohexanol); 4,4'-propylenebis(cyclohexanol); 4,4'-butylenebis(cyclohexanol); 4,4'-isopropylidenebis(cyclohexanol); 4,4'-isobutylenebis(cyclohexanol); 4,4'-dihydroxydicyclohexyl; 4,4'-carbonylbis(cyclohexanol); 3,3'-carbonylbis(cyclohexanol); 4,4'-sulfonylbis(cyclohexanol), 4,4'-oxybis(cyclohexanol), or a combination thereof.

In one embodiment, the diol extender comprises ethylene glycol; 1,3-propanediol; 1,4-butanediol; 1,5-pentanediol; 1,6-hexanediol; 1,2-propanediol; 1,3-butanediol; 2,3-butanediol; 1,3-pentanediol; 1,2-hexanediol; 3-methylpentane-1,5-diol; 1,9-nonanediol; 2-methyloctane-1,8-diol; 1,4-cyclohexanedimethanol; hydroquinone bis (hydroxyethyl)ether; diethylene glycol; dipropylene glycol; tripropylene glycol; ethanolamine; N-methyldiethanolamine; N-ethyldiethanolamine, or a combination thereof.

In one embodiment, diol component can be an ester diol formed by esterifying an aliphatic dicarboxylic acid with an aliphatic diol listed above. Examples of aliphatic dicarboxylic acids include, but are not limited to, adipic acid, azelaic, acid, or glutaric acid. In one embodiment, from about 0.01 to about 0.8 mole of dicarboxylic acid per mole of diol are reacted to produce the ester diol.

In one embodiment, the diol component is the reaction product between an aliphatic diol or triol and a lactone. In one embodiment, 0.01 to 2 moles of lactone per mole of diol or triol are reacted with one another to produce the diol component. Examples of aliphatic diols in this embodiment include, but are not limited to, 1,4-cyclohexanedimethanol, neopentyl glycol, hexane-1,6-diol, ethylene glycol, butane-1,4-diol, or trimethylolpropane. Examples of aliphatic triols include, but are not limited to, glycerol or trimethylolpropane. In one embodiment, the lactone is epsilon-caprolactone.

In one embodiment, the cycloaliphatic diol is from 10 to 90% by weight of the diol component and the diol extender is from 10 to 90% by weight of the diol component, wherein the sum of the weight percentages of the cycloaliphatic diol and diol extender is equal to 100%.

In another embodiment, a polyol is used to prepare the thermoplastic polyurethane. Examples of polyols include, but are not limited to, a polyether polyol, a polyester polyol, a hydroxy-terminated polycarbonate, a hydroxy-terminated polybutadiene, a hydroxy-terminated polybutadiene-acrylonitrile copolymer, a hydroxy-terminated copolymer of a dialkyl siloxane and alkylene oxide, or a combination thereof. In one embodiment, the molecular weight of the polyol is from about 1,250 to about 10,000, preferably, from about 2,000 to about 8,000.

Examples of polyether polyols include, but are not limited to, polyoxyethylene glycol or polyoxypropylene glycol. In one embodiment, polyoxyethylene glycol or polyoxypropylene glycol can be capped with 1) ethylene oxide residues; 2) random and block copolymers of ethylene oxide and propylene oxide; 3) propoxylated tri- and tetrahydric alcohols such as glycerine, trimethylolpropane, or pentaerythritol; 4) polytetramethylene glycol, or 5) random and block copolymers of tetrahydrofuran and ethylene oxide and/or propylene oxide. In one embodiment, the polyether polyol is a random and block copolymer of ethylene and propylene oxide or polytetramethylene glycol. Other examples of polyether polyols useful in the present invention include, but are not limited to vinyl reinforced polyether polyols, such as the polymerization product between styrene and/or acrylonitrile and the polyether polyol.

In one embodiment, a polyether ester can be prepared by reacting a polyether polyol described above with a di- or trifunctional aliphatic or aromatic carboxylic acid. Examples of useful carboxylic acids include, but are not limited to, adipic acid, azelaic acid, glutaric acid, isophthalic acid, terephthalic acid, or trimellitic acid. In one embodiment, the polyester polyol is the polymerization product between epsilon-caprolactone and ethylene glycol or ethanolamine. In one embodiment, the polyester polyol is prepared by the esterification of a polycarboxylic acid such as phthalic acid, terephthalic acid, succinic acid, glutaric acid, adipic acid, or azelaic acid and with a polyhydric alcohol such as ethylene glycol, butanediol, glycerol, trimethylolpropane, 1,2,6-hexanetriol, or cyclohexanedimethanol and the like. In one embodiment, the polyester polyol is prepared by esterifying a dimeric or trimeric fatty acid, optionally mixed with a monomeric fatty acid such as oleic acid, with a long chain aliphatic diol such as hexane-1,6-diol.

In one embodiment, a polyether diamine useful in the present invention is JEFFAMINE®, which is manufactured by Jefferson Chemical Company.

In one embodiment, polycarbonates used to make the thermoplastic polyurethanes of the present invention containing hydroxyl groups useful in the present invention are prepared by reacting a diol, such as propane-1,3-diol, butane-1,4-diol, hexan-1,6-diol, diethylene glycol, triethylene glycol, or dipropylene glycol, with a diarylcarbonate (e.g. diphenylcarbonate) or with phosgene.

In one embodiment, silicon-containing polyethers useful in the present invention are copolymers of alkylene oxides with dialkylsiloxanes such as dimethylsiloxane. The silicon-containing polyethers disclosed in U.S. Pat. No. 4,057,595, which is hereby incorporated by reference in its entirety, can be used in the present invention.

In one embodiment, hydroxy-terminated poly-butadiene copolymers sold under the tradename POLY BD® Liquid Resins manufactured by Arco Chemical Company are useful in the present invention. In one embodiment, hydroxy- and amine-terminated butadiene/acrylonitrile copolymers sold under the tradename HYCAR® hydroxyl-terminated (HT) Liquid Polymers and amine-terminated (AT) Liquid Polymers, respectively, can be used in the present invention.

In one embodiment, the thermoplastic polyurethane is ISOPLAST®, which is manufactured by the Dow Chemical Company. There are a number of different thermoplastic polyurethanes sold under the tradename ISOPLAST®; however, these thermoplastic polyurethanes are typically the reaction product between methylenebis(phenyl isocyanate) and a number of different glycols. In one embodiment, the thermoplastic polyurethane is ISOPLAST® 301, which is the reaction product between methylenebis(phenyl isocyanate), 1,6-hexanediol, cyclohexanedimethanol, and polytetramethylene glycol.

In one embodiment, the thermoplastic polyurethane is from 1 to 10%, preferably from 1 to 9%, more preferably from 1 to 8%, more preferably from 1 to 7%, more preferably from 1 to 6%, more preferably from 1 to 5%, more preferably from 1 to 4%, more preferably from 1 to 3%, more preferably from 1 to 2%, or even more preferably from 1 to 1.5% by weight of the mixture, wherein the sum of the weight percentages of components (a)–(c) is equal to 100 %.

One advantage of the present invention is that only a small amount of thermoplastic polyurethane is required to produce a composite with superior physical properties. Moreover, by using, higher amounts of thermoplastic polyurethane, which is disclosed in the prior art, the viscosity of the resultant composite also increases. The higher the viscosity, the more difficult it is to extrude the composite. The present invention avoids these processing problems by using only a small amount of thermoplastic polyurethane.

Any reinforcing fiber known in the art can be used in the present invention. Examples of reinforcing fibers include, but are not limited to, a glass fiber or carbon fiber. In one embodiment, the reinforcing fiber comprises a glass fiber that has been sized. Sizing involves the application of a coupling agent and a film former on the surface of the fiber. In one embodiment, the coupling agent is a functional silane compound and the film former is an epoxy resin or polyurethane. The surface treatment on the glass fiber should promote good adhesion between the glass fiber and the polymer. In one embodiment, the glass fiber comprises PPG 3540, which is a polyurethane sized glass fiber manufactured by PPG Industries, Inc.

In one embodiment, when the reinforcing fiber comprises a glass fiber, the amount of glass fiber used is from 9.9 to 60% by weight, preferably from 15 to 45% by weight of the mixture.

In one embodiment, the polyester is poly(butylene terephthalate), the thermoplastic polyurethane is ISO-PLAST® 301, and the reinforcing fiber is PPG 3540.

Other components can be used to prepare the polymer composite of the present invention. In one embodiment, an epoxy compound can be used. When an epoxy compound is used in combination with the polymer having at least one isocyanate rective group, the thermoplastic polyurethane, and the reinforcing fiber, the resultant polymer composite possesses enhanced or increased strength and aging characteristics.

In one embodiment, the epoxy compound comprises the reaction product of a phenolic compound and epichlorohydrin to produce a primary epoxide. The phenolic compounds that can be derivatized are known in the art. In one embodiment, the phenolic compound is bisphenol A. In one embodiment, the epoxy compound is XD 9053.01, which is manufactured by the Dow Chemical company. XD 9053.01 comprises (tris-hydroxy phenyl)methane that has been derivatized to form the triglycidyl ether that has been partially oligomerized. In one embodiment, the epoxy compound is from 0.1 to 5% by weight, preferably from 0.1 to 2% by weight, more preferably from 0.25 to 2% by weight of the mixture, wherein the sum of the weight percentages of components (a)–(c) and the epoxy stabilizer is equal to 100%.

Other additives known in the art can be added to the polymer composite. Examples of additives include, but are not limited to, a colorant, a filler, a processing aid, a plasticizer, a nucleating compound, a stabilizer, an antioxidant, a mold release agent, a flame retardant, a reinforcing agent, or a combination thereof. In one embodiment, the reinforcing agent comprises calcium carbonate, talc, iron oxide, mica, montmorillonite, clay, or a combination thereof.

The invention further relates to a method for making a composite, comprising melt mixing
(a) a polymer having at least one isocyanate reactive group, wherein the polymer is from 30 to 90% by weight of the composite;
(b) a thermoplastic polyurethane at from 0.1 to less than 10% by weight of the composite; and
c) a reinforcing fiber at from 9.9 to 60% by weight of the composite,
wherein the sum of the weight percentages of components (a)–(c) is equal to 100%, wherein the polymer (a) is not a polyamide.

The invention further relates to a method for making a composite, comprising melt mixing (a) a polymer having at least one isocyanate reactive group, wherein the polymer is from 25 to 90% by weight of the composite;

(b) a thermoplastic polyurethane at from 0.1 to 10% by weight of the composite;

(c) a reinforcing fiber at from 9.8 to 60% by weight of the composite, and (d) an epoxy compound at from 0.1 to 5% by weight of the composite, wherein the sum of the weight percentages of components (a)–(d) is equal to 100%.

The polymer, thermoplastic polyurethane, and reinforcing fiber can be melt mixed using a variety of techniques known,i in the art. In one embodiment, the polymer composite can be produced by a Brabender Plastograph, Haake plastograph melt mixer (Rheocord 90), a single screw extruder, or a twin screw extruder (such as Werner Pfleiderer equipment).

Not wishing to be bound by theory, it is believed that during melt mixing, the thermoplastic polyurethane depolymerizes to produce an isocyanate intermediate in situ. The polymer, which has at least one isocyanate reactive group, reacts with the isocyanate intermediate. This ultimately results in chain extension, which increases the molecular weight of the polymer. Additionally, the thermoplastic polyurethane and/or the isocyanate intermediate can react with the reinforcing fiber, which improves the interfacial adhesion between the thermoplastic polyurethane and the reinforcing fiber. The combination of the polymer of the present invention, thermoplastic polyurethane, and reinforcing fiber results in the formation of a polymer composite with increased thermal and hydrolytic stability as well as increased mechanical properties such as tensile strength and ductility.

Any of the polymer composites of the present invention can be melt processed and extruded as pellets or chips. The polymer composites can also be molded or shaped to produce a desired article by using extrusion, pultrusion, injection molding, or compression molding techniques.

EXAMPLES

The following examples are put forth so as to provide those of ordinary skill in the art with a complete disclosure and description of how the compositions of matter claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature and pressure is at or near atmospheric.

General Considerations

All of the following examples were prepared using poly (butylene terephthalate) (PBT) having a molecular weight in the range of from 14,000 to 20,000 as determined by gel permeation chromatography against poly(ethylene terephthalate) standards. The thermoplastic polyurethane utilized in these examples is commercially available from Dow Chemical as ISOPLAST® 0301. The glass fiber used in the examples was PPG 3540. The PBT and glass blends were prepared by mixing on a twin screw extruder with a set point of 240° C. The epoxy compound used in the examples was Dow XD 9053.01, and was melt mixed with components (a), (b), and/or (c). The examples were extruded into a cold water bath and pelletized. All compositions are reported on a weight % basis. All formulations contain 2.25 wt % "additives" which consist of antioxidants, stabilizers and processing aids. Mechanical properties were evaluated on injection molded specimens following ASTM methods. Hydrolytic stability was evaluated as a % of tensile strength retained compared to the as molded properties after aging at 100° C., 100% relative humidity for 14 days. Thermal stability was evaluated as a % of tensile strength retained compared to the as molded properties after aging at 190° C. for 500 hours.

Examples 1–6

Example 1 is a comparative example that does not contain the thermoplastic polyurethane additive of this invention or the epoxy compound. Examples 2 and 3 are representative examples of this invention containing 1.5 and 3 wt % of the thermoplastic polyurethane respectively. As can be seen from the Table 1 the strength properties of these formulations have increased significantly as compared to the control Example 1. It should also be noted that the % tensile strength retained after both hydrolytic and thermal aging also increased as compared to Example 1.

Example 4 is a glass fiber reinforced PBT comparative example that contains only an epoxy compound as is common to the art. Examples 5 and 6 are examples of this invention showing the synergistic effect of adding both the epoxy stabilizer as well as the thermoplastic polyurethane of this invention. As can be seen from the data, the addition of thermoplastic polyurethane to the polyester with the epoxy results in further increases in the strength and ductility of the composite as well as even further improved hydrolytic and thermal stability.

TABLE 1

Mechanical Properties of Glass Fiber Reinforced Polyesters

| Example # | 1 | 2 | 3 | 4 | 5 | 6 |
|---|---|---|---|---|---|---|
| Matrix Resin | PBT | PBT | PBT | PBT | PBT | PBT |
| Matrix Resin % | 67.75 | 66.25 | 64.75 | 67.25 | 65.75 | 64.25 |
| Glass Fiber % | 30 | 30 | 30 | 30 | 30 | 30 |
| Additives % | 2.25 | 2.25 | 2.25 | 2.25 | 2.25 | 2.25 |
| Thermoplastic Polyurethane | 0 | 1.5 | 3 | 0 | 1.5 | 3 |
| Epoxy Compound | 0 | 0 | 0 | 0.5 | 0.5 | 0.5 |
| AS MOLDED PROPERTIES | 1 | 2 | 3 | 4 | 5 | 6 |
| Ash (wt %) | 31.6 | 31.7 | 31.9 | 31.9 | 31.7 | 31.7 |

TABLE 1-continued

Mechanical Properties of Glass Fiber Reinforced Polyesters

| | | | | | | |
|---|---|---|---|---|---|---|
| HDT @ 66 psi (.45 MPa) in ° C. | 223 | 223 | 223 | 225 | 222 | 221 |
| HDT @ 264 psi (1.8 MPa) in ° C. | 214 | 212 | 210 | 215 | 211 | 210 |
| Strength, Tensile (MPa) | 115.7 | 139 | 148.3 | 151.4 | 157.6 | 157.7 |
| Tensile Elongation (%) | 1.6 | 2.2 | 2.5 | 2.4 | 2.8 | 2.8 |
| Modulus, Tensile (MPa) | 10879 | 10712 | 10864 | 10831 | 10645 | 10849 |
| Strength, Flexural (MPa) | 152.6 | 189.9 | 204.2 | 226.0 | 226.8 | 227.6 |
| Flexural Elongation (%) | 2.0 | 2.6 | 2.9 | 3.3 | 3.5 | 3.5 |
| Modulus, Flexural (MPa) | 9074 | 9301 | 9344 | 9387 | 9172 | 9142 |
| Notched IZOD @ 23° C. (J/m) | 72.3 | 80.7 | 87.1 | 97.1 | 102.2 | 104.2 |
| Unnotched IZOD @ 23° C. (J/m) | 540.1 | 703.7 | 801.5 | 1019.2 | 1030 | 1077.7 |
| Tensile Strength After Hydrolytic Aging | 55.0 | 70.4 | 81.5 | 125.1 | 131.8 | 133 |
| % Retention of Tensile Strength (H) | 47.5 | 50.6 | 55.0 | 82.6 | 83.6 | 84.3 |
| Tensile after Oven Aging at 190° C. | ** | 110.8 | 120.2 | 115.0 | 132.0 | 134.3 |
| % Retention of T. Strength (190° C.) | ** | 79.7 | 81.1 | 76.0 | 83.8 | 85.2 |

** Too Brittle to Test (sample broke in the grips)

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composite made by the process comprising melt mixing
   (a) a polyester having at least one isocyanate reactive group, wherein the polyester is from 30 to 90% by weight of the composite;
   (b) a thermoplastic polyurethane at from 0.1 to 3% by weight of the composite; and
   (c) a reinforcing fiber at from 9.9 to 60% by weight of the composite, wherein the sum of the weight percentages of components (a)–(c) is equal to 100%;
   wherein the polyester comprises the reaction product between (1) a first glycol component comprising an aliphatic glycol, a cycloaliphatic glycol, an aromatic glycol, or a combination thereof, and (2) a first dicarbonyl component comprising an aliphatic dicarbonyl compound, a cycloaliphatic dicarbonyl compound, an aromatic dicarbonyl compound, or a combination thereof, and (3) a second dicarbonyl compound comprising a $C_4$ to $C_{40}$ dicarbonyl compound.

2. The composite of claim 1, wherein the second dicarbonyl compound comprises succinic acid, glutaric acid, adipic acid, sebacic acid, dimer acid or a combination thereof.

3. The composite of claim 1, wherein the first dicarbonyl component comprises at least 40 mole % of the first dicarbonyl compound, wherein the sum of the dicarbonyl compounds of the first dicarbonyl component equals 100 mole %.

4. A composite made by the process comprising melt mixing
   (a) a polyester having at least one isocyanate reactive group, wherein the polyester is from 30 to 90% by weight of the composite;
   (b) a thermoplastic polyurethane at from 0.1 to 3% by weight of the composite; and
   (c) a reinforcing fiber at from 9.9 to 60% by weight of the composite, wherein the sum of the weight percentages of components (a)–(c) is equal to 100%;
   wherein the polyester has an inherent viscosity of from 0.2 to 1.5 dL/g as determined in 60/40 phenol/tetrachloroethane.

5. A composite made by the process comprising melt mixing
   (a) a polyester having at least one isocyanate reactive group, wherein the polyester is from 45 to 85% by weight of the composite;
   (b) a thermoplastic polyurethane at from 0.1 to 3% by weight of the composite, and
   (c) a reinforcing fiber at from 9.9 to 60% by weight of the composite, wherein the sum of the weight percentages of components (a)–(c) is equal to 100%.

6. A composite made by the process comprising melt mixing
   (a) a polyester having at least one isocyanate reactive group, wherein the polyester is from 30 to 90% by weight of the composite;
   (b) a thermoplastic polyurethane at from 0.1 to 3% by weight of the composite; and
   (c) a reinforcing fiber at from 9.9 to 60% by weight of the composite, wherein the sum of the weight percentages of components (a)–(c) is equal to 100%;
   wherein the thermoplastic polyurethane comprises the reaction product between a polyisocyanate selected from the group consisting of a methylenebis (phenyl diisocyanate), a cycloaliphatic diisocyanate, a cyclohexylene diisocyanate, and a combination thereof, and a diol component.

7. The composite of claim 6, wherein the diol component comprises at least one cycloaliphatic diol and at least one diol extender.

8. The composite of claim 7, wherein the cycloaliphatic diol comprises 1,3-cyclobutanediol; 1,3-cyclopentanediol; 1,2-cyclohexanediol; 1,3-cyclohexanediol; 1,4-cyclohexanediol, 2-cyclohexene-1,4-diol; 2-methyl-1,4- cyclohexanediol; 2-ethyl-1,4-cyclohexanediol; 1,3-cycloheptanediol; 1,4-cycloheptanediol; 2-methyl-1,4-cycloheptanediol; 4-methyl-1,3-cycloheptanediol; 1,3-cyclooctanediol; 1,4-cyclooctanediol; 1,5-cyclooctanediol, 5-methyl-1,4-cyclooctanediol; 5-ethyl-1,4-cyclooctanediol; 5-propyl-1,4-cyclooctanediol; 5-butyl-1,4-cyclooctanediol; 5-hexyl-1,4-cyclooctanediol; 5-heptyl-1,4-cyclooctanediol; 5-octyl-1,4-cyclooctanediol; 4,4'-methylenebis(cyclohexanol); 4,4'-methylenebis(2-methylcyclohexanol)); 4,4'-methylenebis(3-methylcyclohexanol); 3,3'-methylenebis(cyclohexanol); 4,4'-methylenebis(cyclohexanol); 4,4'-propylenebis(cyclohexanol); 4,4'-butylenebis(cyclohexanol); 4,4'-isopropylidenebis(cyclohexanol); 4,4'-isobutylenebis(cyclohexanol); 4,4'-dihydroxydicyclohexyl; 4,4'-carbonylbis(cyclohexanol); 3,3'-carbonylbis(cyclohexanol); 4,4'-sulfonylbis(cyclohexanol), 4,4'-oxybis(cyclohexanol), or a combination thereof.

9. The composite of claim 7, wherein the diol extender comprises ethylene glycol; 1,3-propanediol; 1,4-butanediol; 1,5-pentanediol; 1,6-hexanediol; 1,2-propanediol; 1,3-butanediol; 2,3-butanediol; 1,3-pentanediol; 1,2-hexanediol; 3-methylpentane-1,5-diol; 1,9-nonanediol; 2-methyloctane-1,8-diol; 1,4-cyclohexanedimethanol; hydroquinone bis(hydroxyethyl)ether; diethylene glycol; dipropylene glycol; tripropylene glycol; ethanolamine; N-methyldiethanolamine; N-ethyldiethanolamine, or a combination thereof.

10. The composite of claim 7, wherein the cycloaliphatic diol is from 10 to 90% by weight of the diol component and the diol extender is from 10 to 90% by weight of the diol component, wherein the sum of the weight percentages of the cycloaliphatic diol and diol extender is equal to 100%.

11. A composite made by the process comprising melt mixing
    (a) a polyester having at least one reactive group, wherein the polyester is from 30 to 90% by weight of the composite;
    (b) a thermoplastic polyurethane at from 0.1 to 3% by weight of the composite; and
    (c) a reinforcing fiber at from 9.9 to 60% by weight of the composite, wherein the sum of the weight percentages of components (a)–(c) is equal to 100%;
    wherein the composite further comprises a polyol.

12. The composite of claim 11, wherein the polyol comprises a polyether polyol, a polyester polyol, a hydroxy-terminated polycarbonate, a hydroxy-terminated polybutadiene, a hydroxy-terminated polybutadiene-acrylonitrile copolymer, a hydroxy-terminated copolymer of a dialkyl siloxane and alkylene oxide, or a combination thereof.

13. A composite made by the process comprising melt mixing
    (a) a polyester having at least one isocyanate reactive group, wherein the polyester is from 30 to 90% by weight of the composite;
    (b) a thermoplastic polyurethane at from 0.1 to 3% by weight of the composite; and
    (c) a reinforcing fiber at from 9.9 to 60% by weight of the composite, wherein the sum of the weight percentages of components (a)–(c) is equal to 100%;
    wherein the thermoplastic polyurethane comprises the reaction product between a methylenebis (phenyl isocyanate) and a diol component.

14. A composite made by the process comprising melt mixing
    (a) a polyester having at least one isocyanate reactive group, wherein the polyester is from 30 to 90% by weight of the composite;
    (b) a thermoplastic polyurethane at from 0.1 to 3% by weight of the composite; and
    (c) a reinforcing fiber at from 9.9 to 60% by weight of the composite, wherein the sum of the weight percentages of components (a)–(c) is equal to 100%;
    wherein the thermoplastic polyurethane comprises the reaction product between methylenebis (phenyl isocyanate), 1,6-hexanediol, cyclohexanedimethanol, and polytetramethylene glycol.

15. A composite made by the process comprising melt mixing
    (a) a polyester having at least one isocyanate reactive group, wherein the polyester is from 30 to 90% by weight of the composite;
    (b) a thermoplastic polyurethane at from 0.1 to 3% by weight of the composite; and
    (c) a reinforcing fiber at from 9.9 to 60% by weight of the composite, wherein the sum of the weight percentages of components (a)–(c) is equal to 100%;
    wherein the reinforcing fiber is a polyurethane sized glass fiber.

16. A composite made by the process comprising melt mixing
    (a) a polyester having at least one isocyanate reactive group, wherein the polyester is from 30 to 90% by weight of the composite;
    (b) a thermoplastic polyurethane at from 0.1 to 3% by weight of the composite; and
    (c) a reinforcing fiber at from 9.9 to 60% by weight of the composite, wherein the sum of the weight percentages of components (a)–(c) is equal to 100%;
    wherein the polyester is poly (butylene terephthalate); the thermoplastic polyurethane comprises the reaction product between a methylenebis (phenyl isocyanate) and a diol component; and the reinforcing fiber comprises a polyurethane sized glass fiber.

17. A composite made by the process comprising melt mixing
    (a) a polyester having at least one isocyanate reactive group, wherein the polyester is from 30 to 90% by weight of the composite:
    (b) a thermoplastic polyurethane at from 0.1 to 3% by weight of the composite; and
    (c) a reinforcing fiber at from 9.9 to 60% by weight of the composite, wherein the sum of the weight percentages of components (a)–(c) is equal to 100%;
    wherein the composite further comprises an epoxy compound.

18. A composite made by the process comprising melt mixing
    (a) a polyester having at least one isocyanate reactive group, wherein the polyester is from 30 to 90% by weight of the composite;
    (b) a thermoplastic polyurethane at from 0.1 to 3% by weight of the composite; and
    (c) a reinforcing fiber at from 9.9 to 60% by weight of the composite, wherein the sum of the weight percentages of components (a)–(c) is equal to 100%;
    wherein the composite further comprises an additive.

19. The composite of claim 18, wherein the additive comprises a colorant, a filler, a processing aid, a plasticizer, a nucleating compound, a stabilizer, an antioxidant, a mold release agent, a flame retardant, a reinforcing agent, or a combination thereof.

20. The composite of claim 18, wherein the additive comprises a reinforcing agent comprising calcium carbonate, talc, iron oxide, mica, montmorillonite, clay, or a combination thereof.

21. A composite prepared by the process comprising melt mixing
   (a) a polyester having at least one isocyanate reactive group, wherein the polyester is from 25 to 90% by weight of the composite;
   (b) a thermoplastic polyurethane at from 0.1 to 3% by weight of the composite;
   (c) a reinforcing fiber at from 9.8 to 60% by weight of the composite, and
   (d) an epoxy compound at from 0.1 to 5% by weight of the composite, wherein the sum of the weight percentages of components (a)–(d) is equal to 100%.

22. An article comprising the composite of claim 21.

23. A composite comprising:
   (a) a polyester having at least one isocyanate reactive group, wherein the polyester is from 25 to 90% by weight of the composite;
   (b) a thermoplastic polyurethane at from 0.1 to 3% by weight of the composite;
   (c) a reinforcing fiber at from 9.9 to 60% by weight of the composite; and
   (d) an epoxy compound at from 0.1 to 5% by weight of the composite, wherein the sum of the weight percentages of components (a)–(d) is equal to 100%.

24. A method for making a composite, comprising melt mixing
   (a) a polyester having at least one isocyanate reactive group, wherein the polyester is from 30 to 90% by weight of composite;
   (b) a thermoplastic polyurethane at from 0.1 to 3% by weight of the composite; and
   (c) a reinforcing fiber at from 9.9 to 60% by weight of the composite, wherein the sum of the weight percentages of components (a)–(c) is equal to 100%.

25. A method for making a composite, comprising melt mixing
   (a) a polyester having at least one isocyanate reactive group, wherein the polyester is from 25 to 90% by weight of the composite;
   (b) a thermoplastic polyurethane at from 0.1 to 3% by weight of the composite;
   (c) a reinforcing fiber at from 9.8 to 60% by weight of the composite; and
   (d) an epoxy compound at from 0.1 to 5% by weight of the composite, wherein the sum of the weight percentages of components (a)–(d) is equal to 100%.

* * * * *